United States Patent
Ziegler et al.

(10) Patent No.: US 7,992,433 B2
(45) Date of Patent: Aug. 9, 2011

(54) FUEL LEVEL MEASUREMENT AND RUN TIME INTERPOLATION

(75) Inventors: William Ziegler, Reading, MA (US); Craig L. Bennett, Lunenburg, MA (US)

(73) Assignee: American Power Conversion Corporation, W. Kingston, RI (US)

( * ) Notice: Subject to any disclaimer, the term of this patent is extended or adjusted under 35 U.S.C. 154(b) by 520 days.

(21) Appl. No.: 12/105,559

(22) Filed: Apr. 18, 2008

(65) Prior Publication Data

US 2008/0202599 A1 Aug. 28, 2008

Related U.S. Application Data

(62) Division of application No. 10/976,701, filed on Oct. 29, 2004, now Pat. No. 7,360,529.

(51) Int. Cl.
*G01M 15/00* (2006.01)
(52) U.S. Cl. .............................. 73/114.54; 73/114.69
(58) Field of Classification Search ............... 73/114.54, 73/114.69
See application file for complete search history.

(56) References Cited

U.S. PATENT DOCUMENTS

| | | | |
|---|---|---|---|
| 2,772,049 A * | 11/1956 | Griffith | 701/123 |
| 2,955,464 A * | 10/1960 | Elwell, Jr. | 73/198 |
| 4,217,644 A | 8/1980 | Kato et al. | |
| 4,218,744 A | 8/1980 | Pratt et al. | |
| 4,790,185 A * | 12/1988 | Fedelem et al. | 73/317 |
| 4,981,039 A | 1/1991 | Hayashi et al. | |
| 5,146,901 A | 9/1992 | Jones | |
| 5,303,685 A | 4/1994 | Forgacs | |
| 5,723,870 A | 3/1998 | Crowne et al. | |
| 5,995,886 A | 11/1999 | Tanaka et al. | |
| 6,058,964 A | 5/2000 | Cotton et al. | |
| 6,172,428 B1 | 1/2001 | Jordan | |
| 6,172,432 B1 | 1/2001 | Schnackenberg et al. | |
| 6,172,482 B1 | 1/2001 | Eguchi | |
| 6,252,499 B1 * | 6/2001 | Gerdtz et al. | 340/450.2 |
| 6,269,695 B1 | 8/2001 | Cesternino et al. | |
| 6,283,142 B1 | 9/2001 | Wheeler et al. | |
| 6,408,692 B1 | 6/2002 | Glahn | |
| 6,446,505 B1 | 9/2002 | Wieszt et al. | |
| 6,476,699 B1 | 11/2002 | Amano et al. | |
| 6,571,626 B1 | 6/2003 | Herford | |
| 6,691,025 B2 * | 2/2004 | Reimer | 701/123 |
| 6,792,923 B2 * | 9/2004 | Kumagai et al. | 123/509 |
| 6,825,578 B2 | 11/2004 | Perttu | |
| 6,874,481 B2 * | 4/2005 | Hiraiwa et al. | 123/509 |
| 6,885,919 B1 | 4/2005 | Wyant et al. | |
| 7,142,950 B2 | 11/2006 | Rasmussen et al. | |
| 7,360,529 B2 | 4/2008 | Ziegler et al. | |
| 7,523,745 B2 * | 4/2009 | Troxler et al. | 123/509 |
| 7,665,358 B2 * | 2/2010 | Calabrese | 73/304 R |
| 2002/0024332 A1 | 2/2002 | Gardner | |
| 2003/0048004 A1 | 3/2003 | Fleming et al. | |
| 2003/0048005 A1 | 3/2003 | Goldin et al. | |
| 2004/0025850 A1 | 2/2004 | Hiraiwa et al. | |
| 2004/0123843 A1 | 7/2004 | Kumagai et al. | |
| 2005/0278075 A1 | 12/2005 | Rasmussen et al. | |

FOREIGN PATENT DOCUMENTS

JP 08296516 A 11/1996

\* cited by examiner

*Primary Examiner* — Freddie Kirkland, III
(74) *Attorney, Agent, or Firm* — Lando & Anastasi, LLP

(57) ABSTRACT

At least one aspect of the invention provides an improved fuel sensing system for a generator, in addition, one or more other aspects of the invention provide improved systems and methods for determining remaining run-time of a generator system.

10 Claims, 6 Drawing Sheets

FUEL LEVEL MEASUREMENT AND RUN TIME INTERPOLATION

RELATED APPLICATIONS

This application is a Divisional of U.S. patent application Ser. No. 10/976,701, entitled, "FUEL LEVEL MEASUREMENT AND RUN TIME INTERPOLATION," filed Oct. 29, 2004, which is hereby incorporated herein by reference.

BACKGROUND OF THE INVENTION

1. Field of Invention

The present invention relates to fuel level measurement and more particularly, to the measurement and calculation of fuel level in tanks of electrical generators and run time estimation for the generators.

2. Discussion of Related Art

As known to those skilled in the art, typical engine driven generator sets with sub base tanks and/or with separate fuel tanks have relatively crude methods for detecting and reporting fuel level. One well-known type of device used with such fuel tanks is a float gauge that provides a visual indication such as "E-¼-½-¾-F". It is also known to use level switches set, for example, at 50% and 25% levels to provide low fuel warnings and shut down of a generator. With many generator sets, and in particular diesel generator sets, it is desirable to shut down the generator prior to fuel starvation to prevent engine damage and what can be a laborious task of bleeding air out of a fuel injection system before being able to restart the generator. More advanced fuel measurement systems are available that provide finer resolution in ½ inch to 1 inch increments, and other systems are available that use, for example, voltage dividing sensors that have even higher linear resolutions.

Typical problems with the more advanced systems include the cost of these systems, and further, these systems are often implemented in a conservative manner to prevent shutdown or fuel starvation. Often, shutdown will occur when a tank is as much as 25% full, because of concern of tolerances in the system, and because the exact location of the fuel pickup tube in the tank relative to the sensor is not known with any precision. Many fuel sensors are mounted to the top of the tank, with the lowest reading (i.e. "empty") located at a distance from the bottom of the tank. This can result in an "empty" reading while there is still fuel remaining in the tank. Further, when a fuel tank is located on ground that is not level, a reading at the sensor location may not be indicative of the level of the tank at the location of the fuel pickup tube.

Premature warnings of an impending empty tank can cause a critical system to be shut down early and/or a call for a refill of the tank to be made sooner than necessary.

During the operation of typical generators it is often difficult to determine how much remaining run time is available before refilling of the fuel tank is required. This is caused by inaccuracies in fuel sensors used, lack of fine resolution in the fuel sensors and variability of power draw of loads.

SUMMARY OF THE INVENTION

At least one embodiment of the invention provides an improved fuel sensing system for a generator, in addition, one or more embodiments provide improved systems and methods for determining remaining run-time of a generator system.

One aspect of the invention is directed to a generator system for providing power to a load. The generator system includes a motor generator that generates output power to power the load, a fuel tank operatively coupled to the motor generator to supply fuel to the motor generator, and a fuel pickup and sensor assembly. The fuel pickup assembly includes a mounting device that couples to the fuel tank to mount the fuel pickup and sensor assembly on the fuel tank, a fuel pickup tube coupled to the mounting device to support the fuel pickup tube in the fuel tank, wherein the fuel pickup tube includes an inlet to receive fuel from the fuel tank and an outlet to couple to the motor generator to provide fuel to the motor generator, and a fuel sensor coupled to the mounting device, the fuel sensor having an output to provide an output level indicative of a level of fuel in the fuel tank.

The fuel pickup tube may be constructed and arranged such that a part of the fuel pickup tube contacts an inner bottom surface of the tank at a first location. The fuel sensor may be constructed and arranged such that a part of the fuel sensor contacts the inner bottom surface of the tank at a second location. The first location may be proximate the second location. The fuel pickup tube may be constructed and arranged such that the inlet is at a predetermined height above the inner bottom surface of the tank. The fuel sensor may include a float that is moveable on the fuel sensor based on a level of fuel in the fuel tank. The generator system may further include a control system coupled to the motor generator to control the motor generator and coupled to the output of the fuel sensor to determine a level of fuel in the fuel tank. The control system may be constructed and arranged to detect a minimum reading of the fuel sensor, and to determine a remaining run time of the generator system after the minimum reading has been reached. The control system may be constructed and arranged to periodically update the remaining run time of the generator system. The control system may be constructed and arranged to power the generator system down prior to a starvation point of the fuel pickup tube. The control system may be constructed and arranged to determine a remaining run time of the generator system based on a quantity of power being supplied by the generator system and the level of fuel in the fuel tank. The fuel sensor may be configured to provide output levels indicative of a plurality of fuel levels in the fuel tank including a first fuel level and a second fuel level, and the control system may be constructed and arranged to determine fuel levels in the fuel tank between the first fuel level and the second fuel level.

Another aspect of the invention is directed to a method of monitoring fuel in a generator system having a fuel tank. The method includes inserting a fuel pickup device and a fuel sensor through an opening in the fuel tank until a bottom end of each of the fuel pickup device and the fuel sensor contacts a bottom surface of the fuel tank, and measuring a fuel level of the fuel tank using the fuel sensor.

The method may further include detecting a minimum reading of the fuel sensor, and determining a remaining run time of the generator system after the minimum reading has been reached. The method may also include updating the remaining run time of the generator system, and powering down the generator system prior to a starvation point of the fuel pickup device being reached. The method may include determining a remaining run time of the generator system based on a quantity of power being supplied by the generator system and a level of fuel in the fuel tank. The fuel sensor may be configured to provide output levels indicative of a plurality of fuel levels in the fuel tank including a first fuel level and a second fuel level, and the method may further include determining fuel levels in the fuel tank between the first fuel level and the second fuel level. The method may further include detecting a minimum reading of the fuel sensor, and determining a remaining run time of the generator system after the minimum reading has been reached.

Another aspect of the invention may be directed to a generator system for providing power to a load. The generator system includes a motor generator that generates output power to power the load, a fuel tank coupled to the motor generator to supply fuel to the motor generator, and a fuel pickup and sensor assembly. The fuel pickup and sensor assembly includes an inlet to receive fuel from the fuel tank and an outlet to couple to the motor generator to provide fuel to the motor generator, a fuel sensor having an output to provide an output level indicative of a level of fuel in the fuel tank, and means for maintaining a fixed vertical distance between the inlet and a lowest reading position of the fuel sensor.

The generator system may further include means coupled to the output of the fuel sensor for determining a level of fuel in the fuel tank, means for detecting a minimum reading of the fuel sensor, and means for determining a remaining run time of the generator system after the minimum reading has been reached. The generator system may further include means for updating the remaining run time of the generator system, and means for powering down the generator system prior to a starvation point of the fuel pickup and sensor assembly. The generator system may further include means for determining a remaining run time of the generator system based on a quantity of power being supplied by the generator system and a level of fuel in the fuel tank. The fuel sensor may be configured to provide output levels indicative of a plurality of fuel levels in the fuel tank including a first fuel level and a second fuel level, and the generator system may further include means for determining fuel levels in the fuel tank between the first fuel level and the second fuel level.

Yet another aspect of the invention is directed to a control system for a generator system having a fuel tank with a fuel sensor having an output that provides an indication of a level of fuel in the fuel tank including a first fuel level and a second fuel level. The control system includes a first input to couple to the output of the fuel sensor, and a second input to receive at least one signal indicative of a power output level of the generator system, wherein the control system is constructed and arranged to determine fuel levels in the fuel tank between the first level and the second level.

The control system may be constructed and arranged to determine a remaining run time of the generator system, to detect a minimum reading of the fuel sensor, and to determine a remaining run time of the generator system after the minimum reading has been reached. The control system may also be constructed and arranged to update the remaining run time of the generator system.

Still another aspect of the invention is directed to a control system for a generator system having a fuel tank with a fuel sensor having an output that provides an indication of a level of fuel in the fuel tank including a first fuel level and a second fuel level. The control system includes a first input coupled to the output of the fuel sensor, a second input to receive at least one signal indicative of a power output level of the generator system, and means for determining fuel levels in the fuel tank between the first fuel level and the second fuel level.

The control system may further include means for determining a remaining run time of the generator system, and means for detecting a minimum reading of the fuel sensor, and for determining a remaining run time of the generator system after the minimum reading has been reached. The control system may also include means for updating the remaining run time of the generator system.

Another aspect of the invention is directed to a method for controlling a generator system having a fuel tank with a fuel sensor having an output that provides an indication of a level of fuel in the fuel tank including a first fuel level and a second fuel level, the method includes receiving an indication of the first fuel level in the tank from the fuel sensor, receiving an indication of an output power level of the generator system, and determining fuel levels in the fuel tank between the first fuel level and the second fuel level.

The method may also include determining a remaining run time of the generator system, detecting a minimum reading of the fuel sensor, and determining a remaining run time of the generator system after the minimum reading has been reached. The method may also include updating the remaining run time of the generator system.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
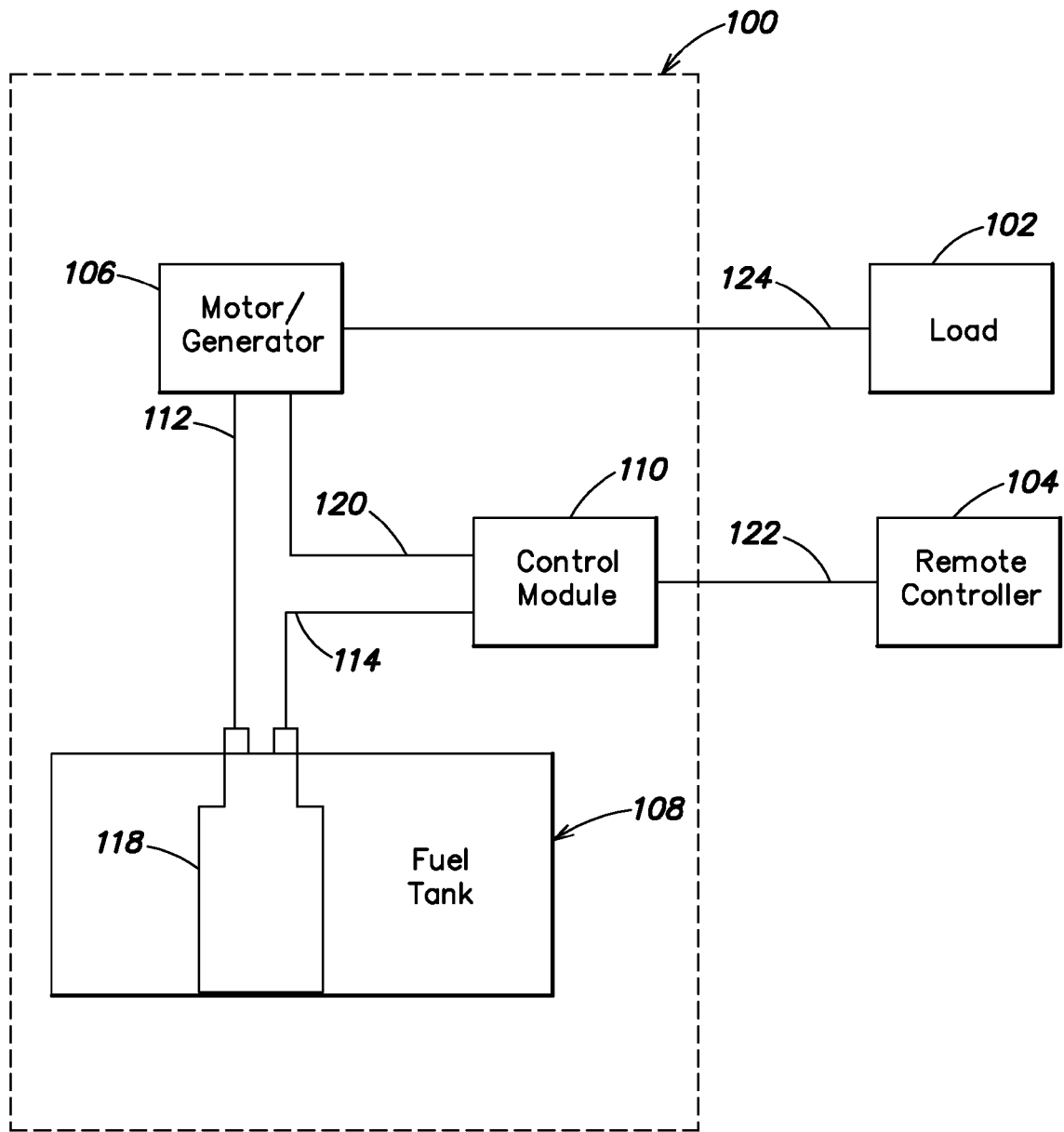
FIG. 1 is a block diagram of a generator system in accordance with one embodiment of the present invention.

Various embodiments and aspects thereof will now be discussed in detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Examples of specific implementations are provided herein for illustrative purposes only. In particular, acts, elements and features discussed in connection with one embodiment are not intended to be excluded from a similar role in other embodiments. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Embodiments of the present invention, which will now be described, provide improved fuel sensor systems for equipment such as generators, and in addition, at least one embodiment of the invention provides improved systems and methods for determining the remaining run time of a generator system, based on remaining fuel and power draw, to allow a user of the system to more accurately plan for an impending shut down, delay a shut down by reducing the power draw of the generator, or prevent a shut down by refilling the fuel tank.

FIG. 1 illustrates a generator system 100 in accordance with one embodiment of the present invention. The generator system 100 is coupled to a load 102 and is coupled to a remote controller 104. The generator system 100 includes a motor generator 106, a fuel tank assembly 108, and a control module 110. The fuel tank assembly includes a fuel pickup tube and sensor assembly 118. A fuel line 112 is coupled between the generator and the fuel tank to provide fuel to the generator, and a sensor line 114 is coupled between the fuel tank assembly and the control module to provide output signals indicative of fuel levels in the tank. One or more control lines 120 are coupled between the motor generator and the control module to provide control and status monitoring of various functions in the motor generator by the control module 110. The control module may be configured to measure output voltage and current of the generator, calculate remaining fuel levels in the fuel tank and monitor other parameters of the generator system. The control module 110 is coupled to the remote controller 104 using remote control lines 122.

As is known, the generator system can be used to provide power to the load 104 using output power lines 124. The remote controller 104 is optional and may be used to provide remote control of the generator system 100. The remote controller may be implemented using a computer system coupled to the control module 110 using dedicated control lines or may be coupled using a local area network, telephone lines or using an Internet connection. The remote controller may be used in embodiments of the invention to allow a user to remotely monitor and control the generator and to use information provided from the generator to calculate and display values of remaining fuel and remaining run time of the generator system.

Figure 2:
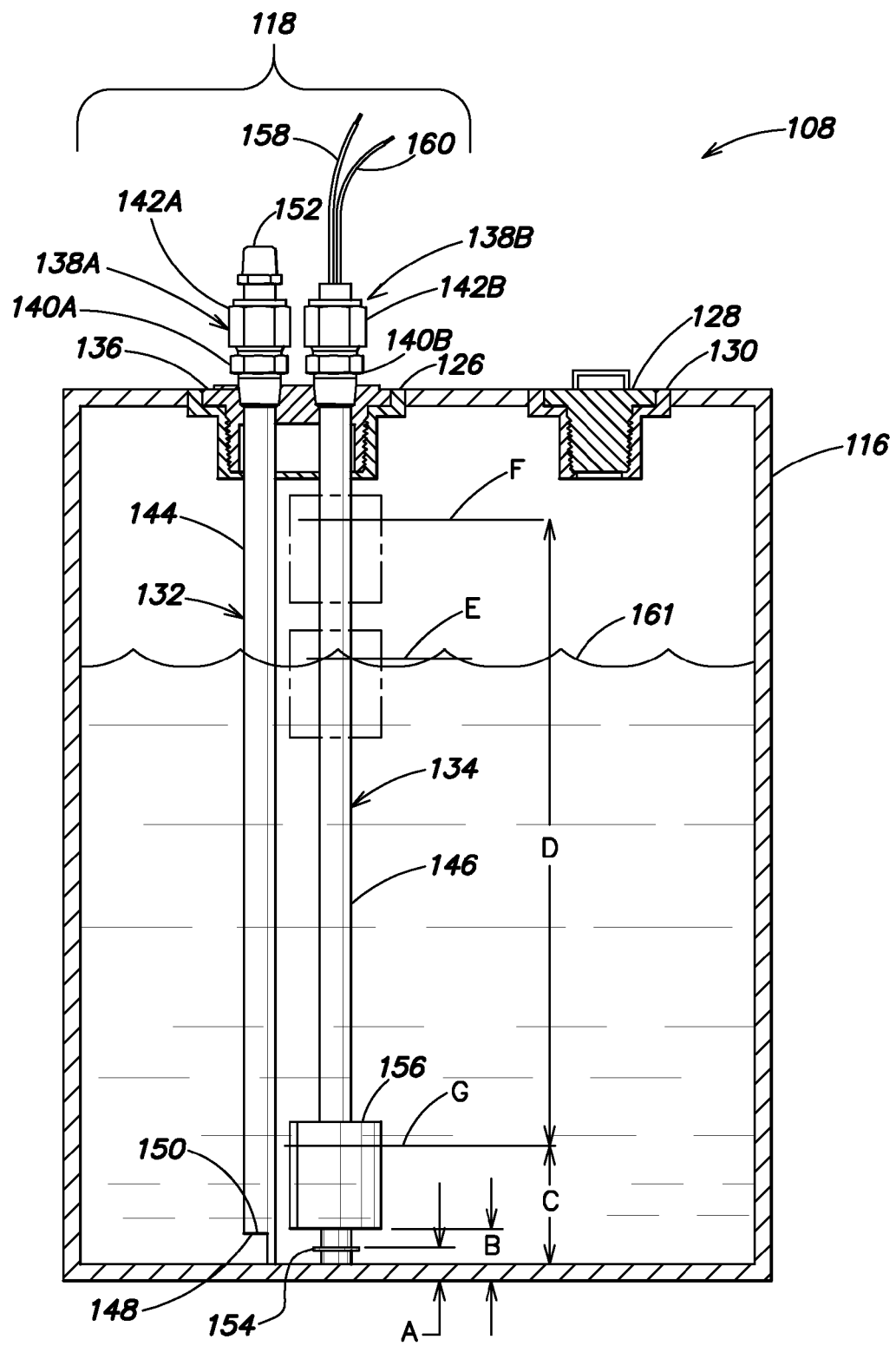
FIG. 2 provides a front-elevated cut-away view of a fuel tank assembly used in the generator system.

The fuel tank assembly 108 is shown in greater detail in FIG. 2. The fuel tank assembly includes a fuel tank 116, the fuel pickup tube and sensor assembly 118, and a fuel cap 128. The fuel pickup and sensor assembly 118 is mounted in a bulkhead fitting 126 of the fuel tank 116, and the fuel cap 128 is mounted in a second bulkhead fitting 130. The fuel cap is removed from the fuel tank when filling the tank with fuel. The fuel tank may be collocated with the generator system or may be implemented using a remote tank.

The fuel pickup tube and sensor assembly includes a pickup tube assembly 132 and a sensor assembly 134 both mounted to a mounting connector 136. In one embodiment, the mounting connector 136 is generally cylindrical in shape and is threaded using a 2 inch NPT (National Pipe Thread Taper) designed to mate with the bulkhead fitting 126 in the fuel tank. The bulkhead fitting 126 may, for example, be welded to the tank 116. Compression fittings 138A and 138B are used to mount the pickup tube assembly 132 and the sensor assembly 134 to the mounting connector 136. Each compression fitting includes a lower portion 140A, 140B and an upper portion 142A, 142B. The lower portions 140A and 140B are threaded or welded to the mounting connector 136 and the upper portions 142A, 142B are threaded onto the lower portions. The pickup tube assembly includes a cylindrical tube 144 and the sensor assembly includes a cylindrical tube 146. The cylindrical tubes 144, 146 are slid through the compression fittings 138A, 138B and the upper portions 142A, 142B are tightened to compress onto the cylindrical tubes and hold them in place. While the tubes 144 and 146 are described as being cylindrical, they need not be cylindrical in all embodiments of the invention, and may have a rectangular cross-section or may be implemented in other ways.

The cylindrical tube 144 of the pickup tube assembly has a notched end 148 located at the bottom of the tube, exposing the hollow portion of the tube to form a pickup hole 150. In one embodiment, the notch is 0.5 inches in length, so the pickup hole is located 0.5 inches from the bottom of the tank. The pickup hole is intentionally vertically disposed from the bottom of the tank to prevent any sludge or debris on the bottom of the tank from being drawn into the pickup tube and supplied to the motor/generator. In one embodiment, used with a diesel fuel tank, the cylindrical tube 144 is implemented using a hollow ½ inch stainless steel pipe with a 0.032 inch thick wall, however, in other embodiments, other materials compatible with the fuel to be used in the tank, may be used. The top 152 of the cylindrical tube 144 is threaded using a ⅜ NPT male threading to allow the fuel hose 112 to mate with the fuel pickup assembly.

In addition to the cylindrical tube 146, the sensor assembly 134 includes a retaining ring 154, a magnetic float 156, and sensor lines 158 and 160. The cylindrical tube 146 of the sensor assembly 134 is implemented using a hollow ½ inch brass tube. The magnetic float floats on the top surface of fuel in the tank 116 and is moveable along the cylindrical tube 146 as the level of the fuel changes.

In FIG. 2, the magnetic float 156 is shown at a position G representing the bottommost sensor measurement position of the magnetic float, and the magnetic float is also shown in phantom at locations E and F. Position E represents the position of the magnetic float for a level of fuel 161 shown in the tank 116, and position F is the uppermost measurement position of the float in the tank. Internal to the cylindrical tube 146 is a circuit board containing a number of magnetic reed switches and resistors. As is known, the magnetic reed switches are opened and closed as the float moves along the cylindrical tube 146. As described below, the resistance across sensor lines 158 and 160 changes as the switches are opened and closed. In one embodiment, the magnetic float is made from buna-N nitrile rubber and includes three cylindrical bar magnets potted into the float, with the axis of the magnets parallel to the axis of the sensor tube. The retaining ring 154 in one embodiment is made from beryllium copper and is used to keep the float from contacting the bottom of the tank 116, which may contain sludge or other debris that could adhere to the float and affect its performance.

Figure 3:
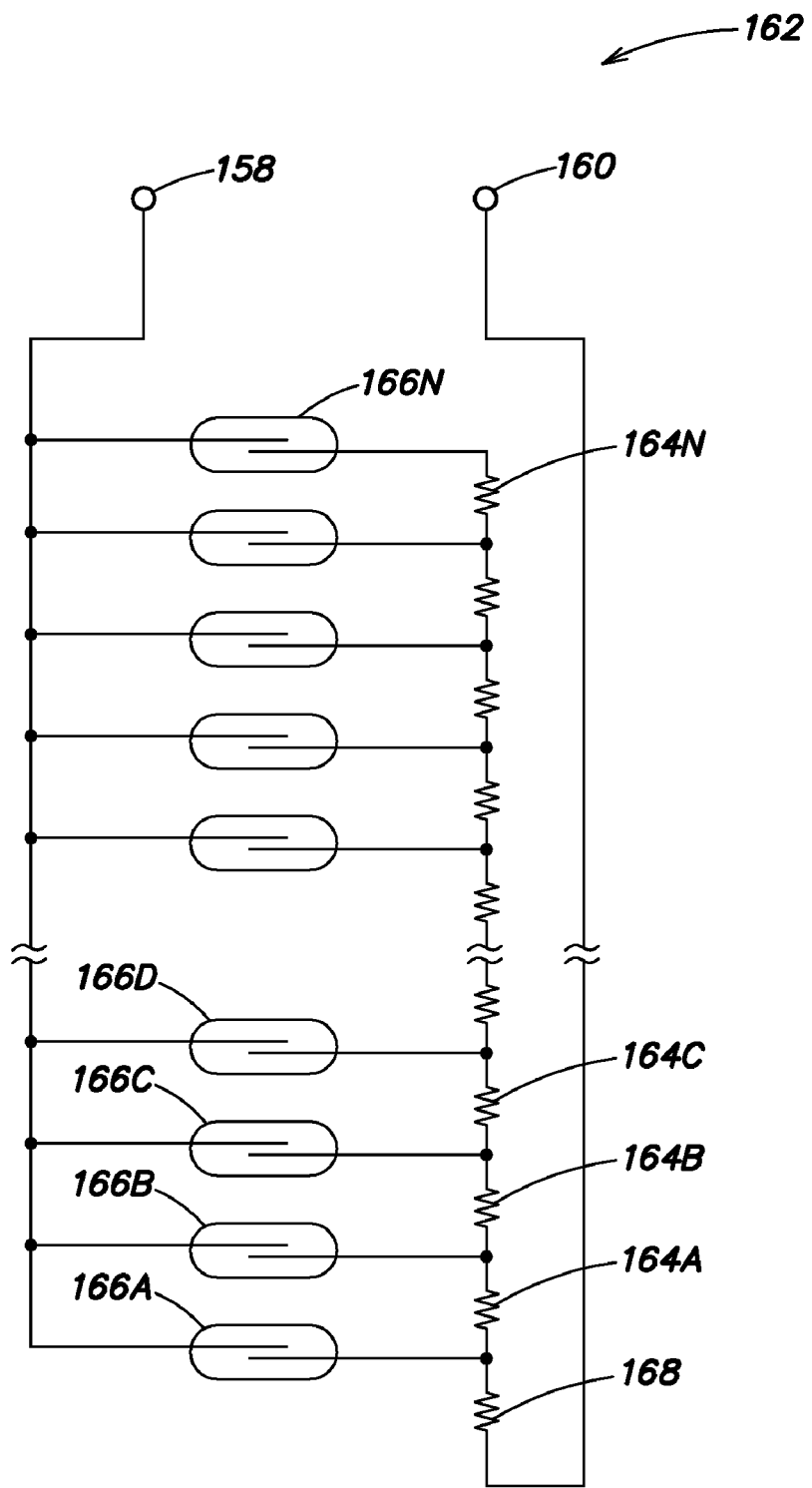
FIG. 3 is a schematic diagram of an electronic circuit used in a sensor assembly of the fuel tank assembly shown in FIG. 2.

FIG. 3 shows a schematic diagram of a sensor circuit 162 used inside the cylindrical tube 146 in accordance with one embodiment of the invention. The sensor circuit includes a first resistor 168, sensor resistors 164A, 164B, 164C, 164N and magnetic reed switches 166A, 166B, 166C, 166D, 166N. Depending on the length of the cylindrical tube 146 and the spacing of the magnetic reed switches in the tube for a particular application, the actual number of magnetic reed switches and sensor resistors will vary as indicated by the broken lines in the schematic diagram of the sensor circuit 162. In one embodiment, thirty-two sensor resistors and 33 magnetic reed switches are used with the reed switches having a spacing of ½ inch. In one embodiment, the sensor resistors are implemented using 50 ohm resistors and the first resistor is implemented using a 600 ohm resistor.

In operation, when the magnetic float is at the bottommost position, only switch 166A is closed resulting in a resistance of 600 ohms across sensor lines 158 and 160. As fuel is added, and the float raises, switch 166A opens and switch 166B closes resulting in a resistance across sensor lines 158 and 160 of 650 ohms. The resistance across the sensor lines 158 and 160 continues to increase as the float raises until the topmost position (F in FIG. 2) is reached. At the topmost position, the resistance value is equal to 600+50N ohms. In one embodiment, to ensure that a valid resistance reading is always present, the circuit and the magnets are configured such that at least two switches are always closed with a third switch being closed before another switch is opened.

As discussed above, the sensor lines 158 and 160 are coupled to the control module 110. In one embodiment, the control module is programmed to determine the remaining fuel in the tank 116 based on the resistance across the sensor lines 158 and 160. With reed switch spacing of ½ inch, the control module is able to determine the fuel level in the tank with a resolution of ½ inch. Further, as described below, embodiments of the present invention are able to determine the remaining fuel level with greater resolution using the assembly shown in FIG. 2. Further, embodiments of the present invention are able to provide an indication of remaining fuel in the tank for fuel levels below the lowest reading level (position G of float 156 in FIG. 2) of the sensor assembly 134.

As discussed above, in the fuel pickup tube and sensor assembly, the bottoms of both the pickup tube assembly and the sensor assembly are configured to contact the bottom of the fuel tank assembly. Accordingly, by maintaining tight tolerances in the manufacture of the assemblies, a known distance may be maintained between the bottommost measurement point of the sensor assembly and the bottom of the tank 116, and a known distance may be maintained between the pickup hole 150 and the bottom of the tank 116. Further, the distance between the bottommost measurement point of the sensor and the pickup hole is maintained constant, and this distance can be used in embodiments of the invention along with the known geometry of the fuel tank to determine the remaining useable fuel in the tank below the bottommost sensor point. Any fuel in the tank below the pickup hole will not be drawn into the engine and accordingly, the effective bottom point of the tank is the lowest point at which fuel can be drawn in to the pickup hole, which is referred to herein as the starvation point of the pickup hole.

In the embodiment shown in FIG. 2, at the bottommost position G of the float 156, the bottom of the float 156 is located a distance B from the bottom of the tank, and the level of the fuel of the tank at this position is equal to distance C. The difference between distances B and C is dependent on the material used for the float 156 and the specific gravity of the particular fuel being used. In one embodiment, used with diesel fuel having a specific gravity of 0.80, B is equal to 0.5 inches, C is equal to 2.0 inches, and A is equal to 0.25 inches. Further, for this embodiment, the horizontal distance between the center of the pickup tube and the center of the sensor assembly is approximately 2.0 inches. In embodiments of the invention, by minimizing the horizontal distance between the pickup tube and the sensor assembly, any errors in determining remaining fuel caused by inconsistencies in the bottom of the tank or by a non-level surface on which the tank sits will be reduced.

Figure 4:
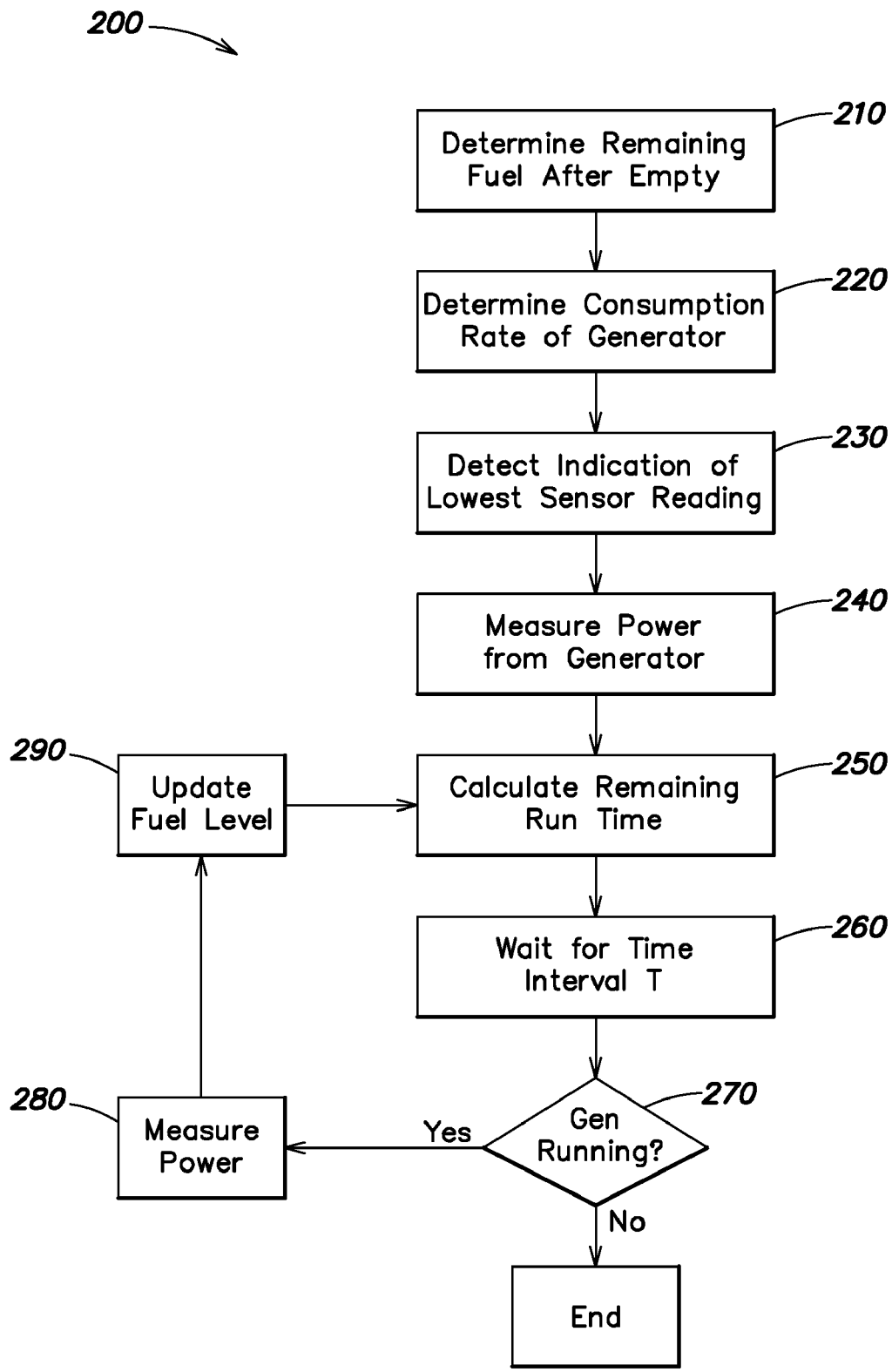
FIG. 4 shows a flow chart of a process for determining remaining run time of a generator system in accordance with one embodiment of the present invention.
Figure 5:
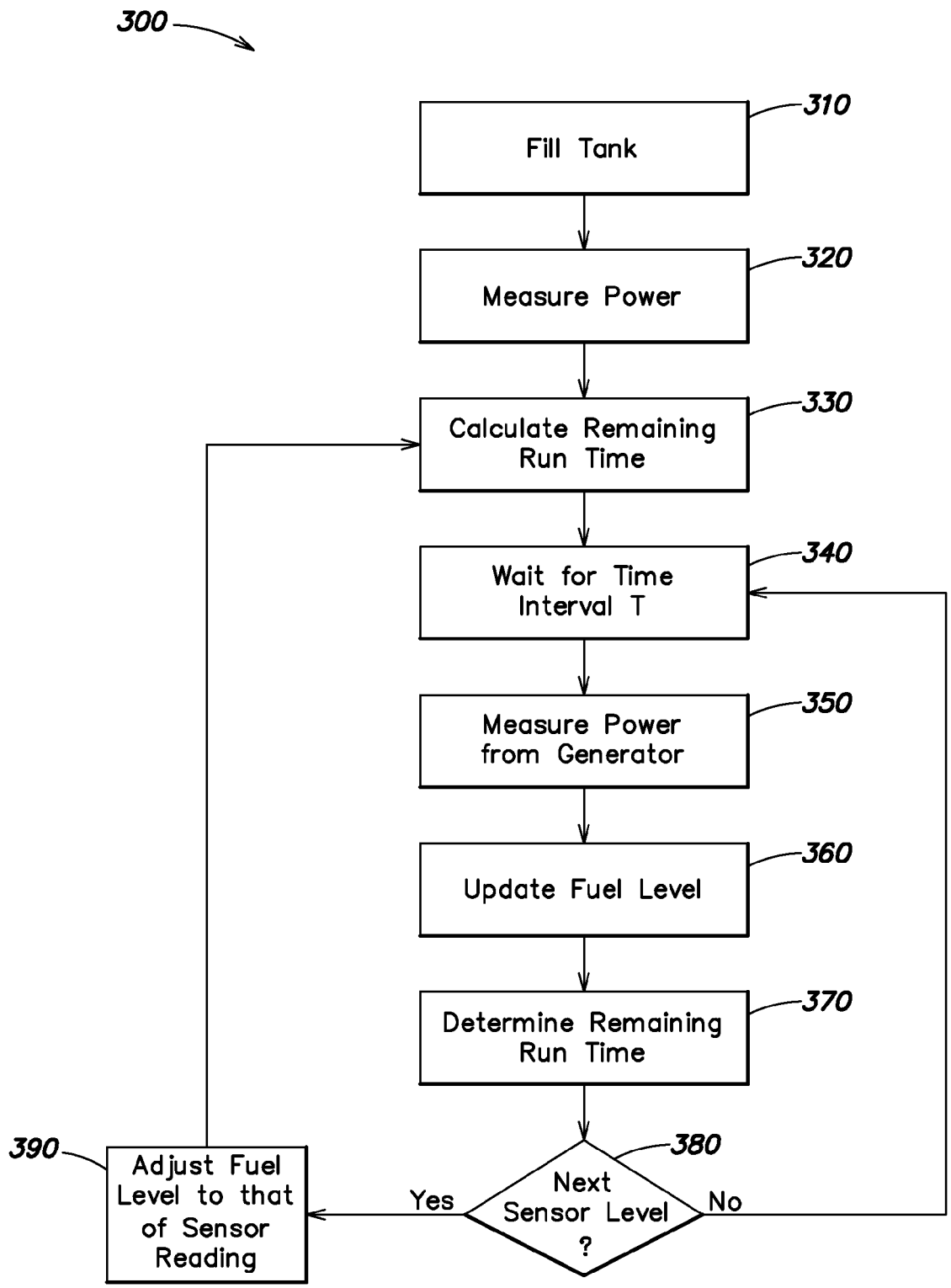
FIG. 5 shows a flow chart of a process for determining remaining run time in another embodiment.

Processes for determining remaining fuel and run time in a generator in accordance with embodiments of the present invention will now be described with reference to FIGS. 4 and 5. The processes described below may be used with a generator system having the pickup tube and sensor assembly described above, but these processes are not limited for use with any particular sensor or pickup tube. FIG. 4 shows a flow chart of a first process 200 that determines remaining fuel and remaining run time between the lowest sensor reading of a fuel system and the starvation point of the pickup hole. In a first stage 210 of the process 200, the useable amount of fuel remaining in a fuel tank after the final sensor reading is determined. As discussed above, this value of fuel can be calculated based on the relative vertical displacements of the fuel sensor and the pickup hole and using the geometry of the fuel tank. Alternatively, this value can be determined by continuing to run the generator once the lowest sensor reading has been reached at a known power level (and fuel consumption rate), and measuring the time until the generator stops for lack of fuel.

In a second stage 220, the fuel consumption rate of the generator is determined for different levels of power being supplied by the generator. The fuel consumption rate may be determined using manufacturer's specifications for the generator or may be determined experimentally by operating the generator at different power levels while monitoring fuel consumption.

The first two stages 210 and 220 of the process 200 are typically performed prior to normal operation of the generator system. The remaining stages of the process 200 may be performed during normal operation of the generator system to allow a user to more accurately determine remaining fuel and remaining run time. At stage 230, during operation of the generator system, the system detects that the lowest fuel sensor indication has been reached (point G in FIG. 2). At stage 240, the instantaneous power being provided by the generator is determined, and at stage 250 a remaining run time is calculated based on the fuel consumption rate for the power draw measured and based on the remaining fuel in the tank. The remaining run time may then be displayed to a user, for example at the control module 110 or the remote controller 104.

The process then waits at stage 260 for a predetermined time interval T, which in one embodiment is equal to 10 seconds, then if the generator is still running (stage 270), then output power is again measured at stage 280. Next, at stage 290, the fuel level in the tank is updated based on the power level, the prior fuel level, the time interval T and the fuel consumption rate values for the generator. If the power level measured at stage 280 is the same (within a predefined tolerance) as the previous measurement, then the calculation to determine the updated fuel level is performed assuming a steady power level since the previous calculation. If the power level measured at stage 280 is different than the previous measurement, then one of a number of techniques may be used to determine the value of power level to use to calculate the updated fuel level. In one embodiment, the prior power level is used, in another embodiment, the present power level is used, in still another, an average of the present and prior power level is used, and still finally, in another embodiment, the greater of the two power levels is used. The process then returns to stage 250 where the remaining run time is calculated based on the updated fuel level value. Using the above procedure, the remaining run time is updated every T seconds. The time interval T may be reduced or increased based on individual system needs and capabilities. The process 200 will continue to run until either the generator is turned off or the fuel level reaches the starvation point.

If the generator stops running during the process 200, then the last calculated value of remaining fuel can be stored and used to calculate values of remaining run time if the generator is re-started prior to filling the tank. In one embodiment, when the generator stops, a calculation is made as to how much time has passed since the fuel level was updated, and the fuel level is updated based on the last fuel measurement, the time that has passed, and the last power measurement.

In one embodiment of the process 200, a shutdown command is provided to the generator once the fuel level drops below a predetermined threshold, which occurs shortly before the starvation point, to avoid the fuel lines running dry and possibly requiring bleeding of the fuel lines prior to a restart of the generator. In other embodiments, when it is desirable to run the generator as long as possible, the generator is allowed to run to the starvation point.

In one embodiment described above, the remaining fuel and run time of the generator is calculated at regular intervals. In another embodiment, in addition to conducting calculations at regular intervals, updates to the remaining fuel and run time are conducted whenever either the current or voltage draw of the generator is changed by more than a preset threshold. In this embodiment, the voltage and the current at the output of the generator are continuously monitored and when a change in either voltage or current occurs greater than the threshold, then a new power draw value and corresponding fuel consumption rate is determined. At this time, the remaining fuel in the tank is calculated based on the last calculation of fuel, the time since the last calculation and the fuel consumption rate for the last power draw measurement. Based on the new level of fuel and the new fuel consumption rate, a new remaining run time is calculated.

In another embodiment, a process 300 which will now be described with reference to FIG. 5, may be used in conjunction with the process 200, or may be used separately to provide greater resolution of the remaining fuel in a fuel tank than that provided by a fuel sensor, such as the sensor assembly 134 described above. The sensor assembly 134 described above may be designed to change sensor readings when the fuel level decreases below the prior reading. For example for a sensor that has a resolution of $1/8^{th}$ of a tank, the sensor will read "7/8" from the point at which the level decreases below full until the 7/8 level. In this manner, the sensor reading is always equal to or less than the actual level in the tank. In another embodiment, the calibration of the sensor may be such that the sensor assembly is designed to change sensor readings when the next actual level is reached, such that the reading is always equal to or greater than the actual level in the tank. Using the process 300 described below a more accurate reading of remaining fuel in the tank can be determined. The process 300 starts at stage 310 with the filling of the fuel tank. Once filled, as indicated by the level of the sensor assembly 134, the actual level in the tank is equal to the full level (position F in FIG. 2). In one embodiment of the invention, the tank and fuel system are calibrated such that the quantity of fuel contained in the tank when full is known.

At stage 320, the output power of the generator is measured, and using known fuel consumption rate values for the generator as discussed above, the remaining run time is calculated at stage 330. At stage 340, the process 300 waits for a time interval T, which in one embodiment is equal to 10 seconds, to pass, and the output power is again measured at stage 350. Next, at stage 360, the fuel level in the tank is updated based on the power level, the prior fuel level, the time interval T and the fuel consumption rate values for the generator. The manner by which the fuel level is updated at stage 360 may be the same as that described above for stage 290 of process 200. Next, in process 300 at stage 370, the remaining run time is updated based on the fuel level calculated in stage 360 and the power draw from stage 350.

At decision block 380, a determination is made as to whether the sensor reading has changed. If the outcome of decision block 380 is NO, then process 300 continues at stage 340, and stages 350 to 380 are repeated. If the outcome of decision block 380 is YES, then process 300 continues at stage 390 where the remaining fuel level is adjusted to equal that indicated by the sensor reading. The process then continues at stage 330, where remaining run time is recalculated based on the fuel level from stage 390 and the last power measurement from stage 350.

The process 300 allows remaining fuel and run time to be calculated at intervals between sensor readings. In at least one embodiment, the remaining fuel and run time calculations are updated to reflect those indicated by the sensor at each new sensor reading. The updates to the values may provide more accurate readings. In at least one embodiment, the remaining fuel calculation conducted in process 300 takes into consideration remaining fuel located below the final sensor reading. In particular, the initial value used for quantity of fuel in the tank when full is calibrated based on the location of the pickup hole in the tank. Subsequently, when the remaining fuel level is updated based on a sensor reading, the value indicated by the sensor reading is adjusted based on the quantity of fuel in the tank below the final sensor reading. For example, for a tank having a capacity of 500 gallons (from the full point to the pickup hole in the intake tube) with a quantity of fuel between the final sensor reading to the pickup hole equal to 50 gallons, the 50% fuel sensor reading (assuming a linear sensor is used) will occur when there are actually 275 gallons remaining. In this example, the range of the sensor is from a low of 50 gallons (at the empty sensor reading) to a high of 500 gallons (at the full sensor reading), and accordingly, the halfway point of the sensor occurs when there are 225 gallons left in the tank above the lowest sensor reading (275 gallons total remaining). The actual reading of the tank is biased upward based on the quantity of fuel below the lowest sensor reading to provide more accurate values in stages 390 and 400 of process 300.

The processes 200 and 300 described above may be performed in software, hardware or firmware, including for example, specially programmed, special-purpose hardware, for example, an application-specific integrated circuit (ASIC) any of which may located in the control module, in the remote controller, or in some combination of the control module and the remote controller. Further, various methods acts and systems described above, including the remote controller, may be implemented using a general purpose computer system or a distributed computer system programmed to perform the functions described above. Such a computer system may include a computer readable and writeable non-volatile recording medium, such as a disk or flash memory, that store signals which define one or more programs to implement processes of embodiments of the invention.

Figure 6:
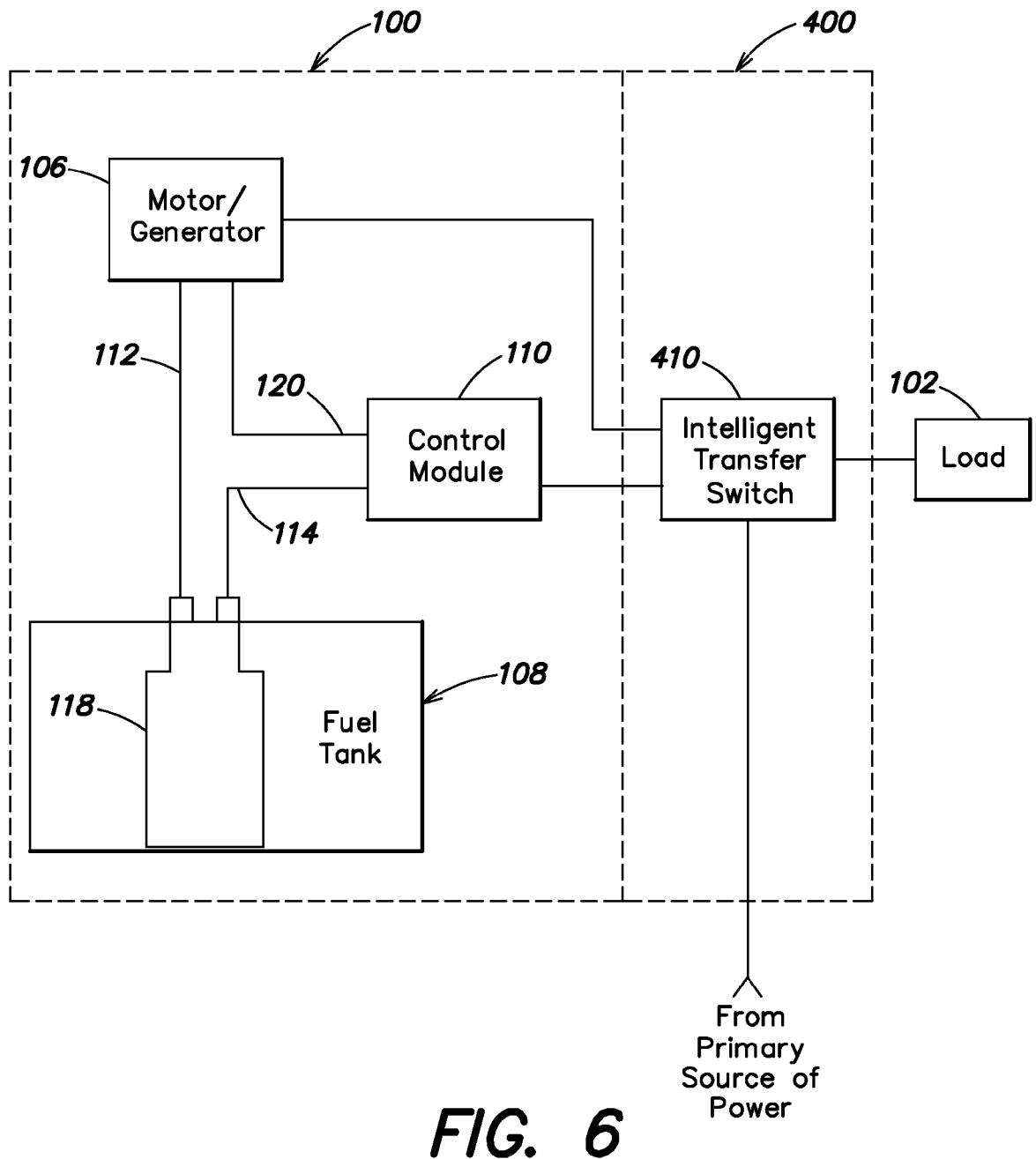
FIG. 6 is a block diagram of the generator system of FIG. 1 shown coupled to a transfer switch and control assembly.

Another embodiment of a generator system 400 of the present invention will now be described with reference to FIG. 6. The generator system 400 includes the generator system 100 and in addition includes an intelligent transfer switch 410 coupled between the output of the motor generator 106 and the load 102. In embodiments of the present invention, the intelligent transfer switch controls the application of power to the load 102 from at least one of the generator system 100 and a primary power source. The intelligent transfer switch may be located near the generator system or may be remote from the generator system, for example, the intelligent transfer switch may be located inside a data processing facility, while the generator system 100 is located outside of the facility. In one embodiment, the intelligent transfer switch may be implemented using systems and processes described in U.S. patent application Ser. No. 10/856,741, filed May 28, 2004, titled "Methods and Apparatus for Providing and Distributing Standby Power" to Rasmussen et al, which is incorporated herein by reference in its entirety.

In embodiments of the invention, the processes described above for calculating remaining fuel and remaining run time may be implemented in the intelligent transfer switch based on monitor signals received by the intelligent transfer switch from the control module 110 and based on power levels measured by the intelligent transfer switch. Further, as described in application Ser. No. 10/856,741, procedures may be implemented within the intelligent transfer switch to reduce the power draw from the generator by, for example, disconnecting certain loads, to increase the remaining run time of the generator. The remote controller 104 described for use with the system of FIG. 1, may be used in the system 400 in addition to the intelligent transfer switch to provide additional remote control and monitoring capabilities.

At least one embodiment of the present invention described above includes a methodology for determining fuel usage of a generator system by measuring power at discrete time intervals, using fuel rate tables to determine fuel usage since a last power measurement, and summing fuel usage values of each time interval. In another embodiment, rather than determine fuel usage using discrete intervals of time, an integrator may be used to provide a continuous measurement. As known to those skilled in the art, such an integrator may be implemented in hardware or software located in the control module of the generator, in a remote controller, or in an intelligent transfer switch coupled to the generator system.

Systems and processes of the present invention described above include fuel tanks that utilize reed type sensors. One of a number of different reed type sensors may be used in embodiments of the present invention and in addition, embodiments of the present invention may be used with other types of sensors as well including inductive float sensors, inductive proximity sensors, capacitive proximity sensors, strain gauges, pressure gauges, resistive tape sensors, and glass scale with float sensors. Further, embodiments of the invention may be used with generator systems that have the ability to detect an analog voltage signal as the output from a fuel sensor, allowing still additional types of sensors to be used.

In one embodiment, processes and systems of the present invention may include a generator system manufactured by Cummins Power Generation of Minneapolis, Minn., including those sold under the trade name DN-Series of generators. In such a generator system, to implement one embodiment of the invention, a 2" NPT plug in the fuel tank is removed and a sensor assembly such as that shown in FIG. 2 is put into the tank in place of the plug. The existing fuel line is then moved to couple to the fuel pick up tube of the sensor assembly. In such an implementation, existing control lines in the generator can be used to couple to the sensor lines of the sensor assembly. In one embodiment, control lines from the control module that are designed to monitor oil temperature are coupled to the sensor lines and the control module along with the remote controller and/or the intelligent transfer switch may be configured to determine fuel levels in the tank based on signal levels measured on the control lines.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention.

Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of monitoring fuel in a generator system having a fuel tank, the method comprising:
    inserting a fuel pickup device and a fuel sensor through an opening in the fuel tank until a rigid bottom end of each of the fuel pickup device and the fuel sensor directly contacts a bottom surface of the fuel tank wherein the fuel pickup device has an inlet, and wherein inserting the fuel pickup device includes positioning the inlet at a fixed height above the bottom surface of the fuel tank; and
    measuring a fuel level of the fuel tank using the fuel sensor.

2. The method of claim 1, further comprising detecting a minimum reading of the fuel sensor, and determining a remaining run time of the generator system after the minimum reading has been reached.

3. The method of claim 2, further comprising updating the remaining run time of the generator system.

4. The method of claim 3, further comprising powering down the generator system prior to a starvation point of the fuel pickup device being reached.

5. The method of claim 1, further comprising determining a remaining run time of the generator system based on a quantity of power being supplied by the generator system and a level of fuel in the fuel tank.

6. The method of claim 5, wherein the fuel sensor is configured to provide output levels indicative of a plurality of fuel levels in the fuel tank including a first fuel level and a second fuel level, and wherein the method further includes determining fuel levels in the fuel tank between the first fuel level and the second fuel level.

7. The method of claim 6, further comprising detecting a minimum reading of the fuel sensor, and determining a remaining run time of the generator system after the minimum reading has been reached.

8. A method for monitoring fuel in a generator system having a fuel tank with a fuel sensor having an output that provides an indication of a level of fuel in the fuel tank including a minimum fuel level reading, the method comprising:
    receiving an indication of the minimum fuel level reading in the tank from the fuel sensor, wherein the minimum fuel level reading corresponds to a lowest level of fuel the fuel sensor is configured to measure;
    receiving an indication of an output power level of the generator system; and
    determining fuel levels in the fuel tank below the minimum fuel level reading.

9. The method of claim 8, further comprising determining a remaining run time of the generator system.

10. The method of claim 9, further comprising updating the remaining run time of the generator system.

* * * * *